United States Patent
Mangaru et al.

(10) Patent No.: US 9,495,699 B2
(45) Date of Patent: Nov. 15, 2016

(54) METHOD AND SYSTEM FOR PURCHASING OF GOODS AND SERVICES VIA IMAGE RECOGNITION

(71) Applicant: MasterCard International Incorporated, Purchase, NY (US)

(72) Inventors: Zavida Mangaru, Valley Stream, NY (US); Brian Hart Dobson, Wilton, CT (US); Lisa Maria Bongiovi, Middle Village, NY (US); John Gioacchini, Yorktown Heights, NY (US); Jennifer Diane Smith, Tarrytown, NY (US); Miroslaw Michalski, Morristown, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 14/052,073

(22) Filed: Oct. 11, 2013

(65) Prior Publication Data

US 2015/0106233 A1    Apr. 16, 2015

(51) Int. Cl.
G06Q 30/06 (2012.01)

(52) U.S. Cl.
CPC ...... *G06Q 30/0623* (2013.01); *G06Q 30/0635* (2013.01); *G06Q 30/0641* (2013.01)

(58) Field of Classification Search
USPC .................................................. 705/26.1–27.2
See application file for complete search history.

(56) References Cited

U.S. PATENT DOCUMENTS

| | | | |
|---|---|---|---|
| 2007/0106570 A1* | 5/2007 | Hartman et al. | 705/26 |
| 2007/0118434 A1* | 5/2007 | Mengerink et al. | 705/26 |
| 2009/0006988 A1* | 1/2009 | Lu et al. | 715/762 |
| 2011/0264549 A1* | 10/2011 | Lewis et al. | 705/26.1 |
| 2012/0284147 A1* | 11/2012 | Nie et al. | 705/26.41 |
| 2012/0290480 A1* | 11/2012 | Chen | 705/44 |
| 2012/0299961 A1* | 11/2012 | Ramkumar et al. | 345/632 |
| 2013/0088615 A1* | 4/2013 | Altieri | H04N 5/225 348/231.3 |

OTHER PUBLICATIONS

Khosrowpour, Mehdi. Dictionary of Information Science and Technology. Hershey, PA: IGI Global, 2007. eBook Collection (EBSCOhost). Web. Dec. 14, 2015.*

\* cited by examiner

*Primary Examiner* — Jeffrey A Smith
*Assistant Examiner* — Lindsey Smith
(74) *Attorney, Agent, or Firm* — Buchanan Ingersoll & Rooney PC

(57) ABSTRACT

A method for facilitating an image-based transaction includes: capturing, by a first input device, an image of a product to be sold; receiving, by a second input device, product data corresponding to the product to be sold; identifying, by a processing device, a transaction identifier; encoding, by the processing device, the captured image with at least the identified transaction identifier; adding, to the encoded image, an indication of availability of the product to be sold such that user interaction with the encoded image will initiate a payment transaction for the product to be sold based on at least the encoded transaction identifier; and transmitting, by a transmitting device, at least the received product data, the identified transaction identifier, and the encoded image including the indication of availability.

28 Claims, 11 Drawing Sheets

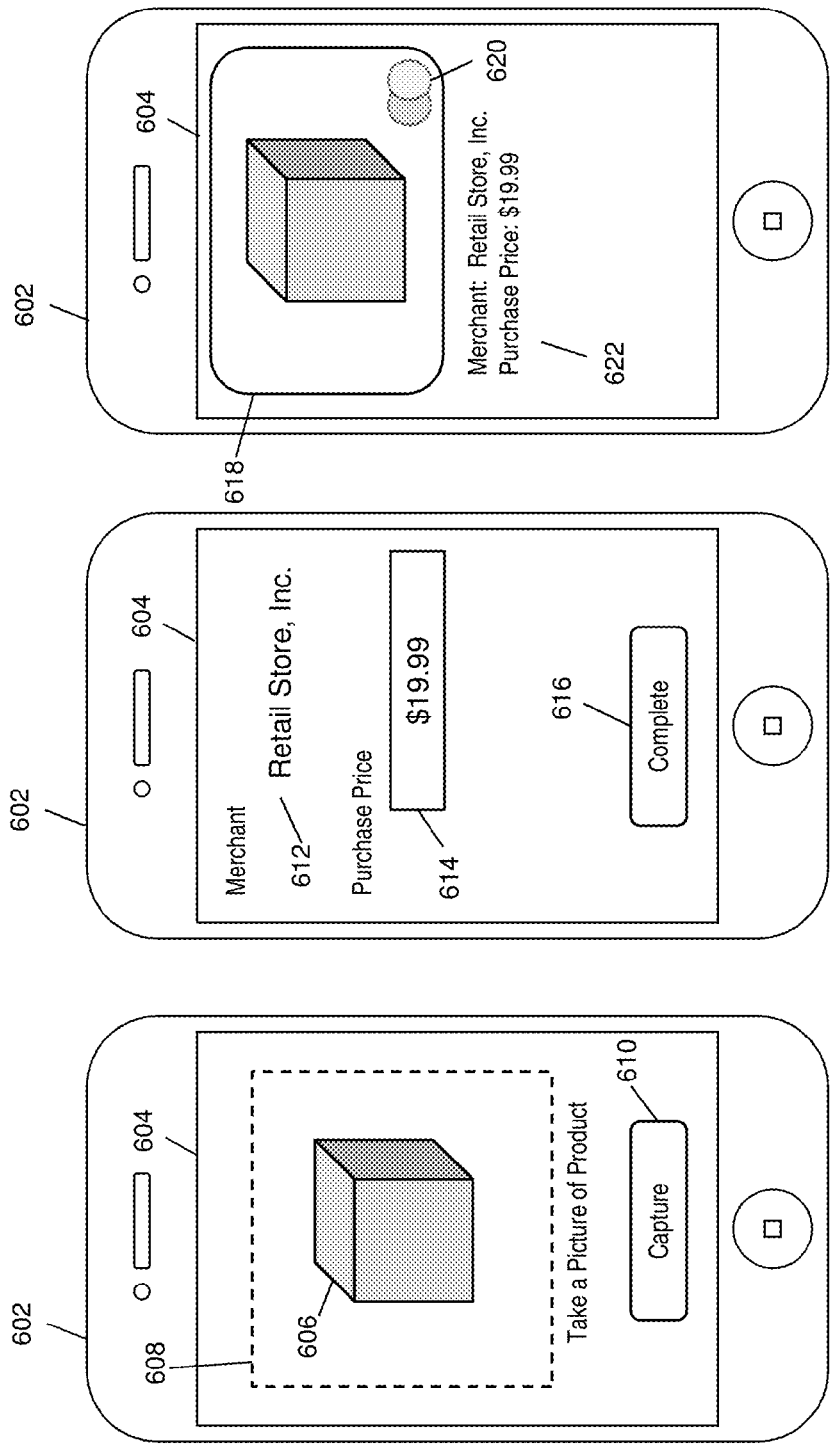

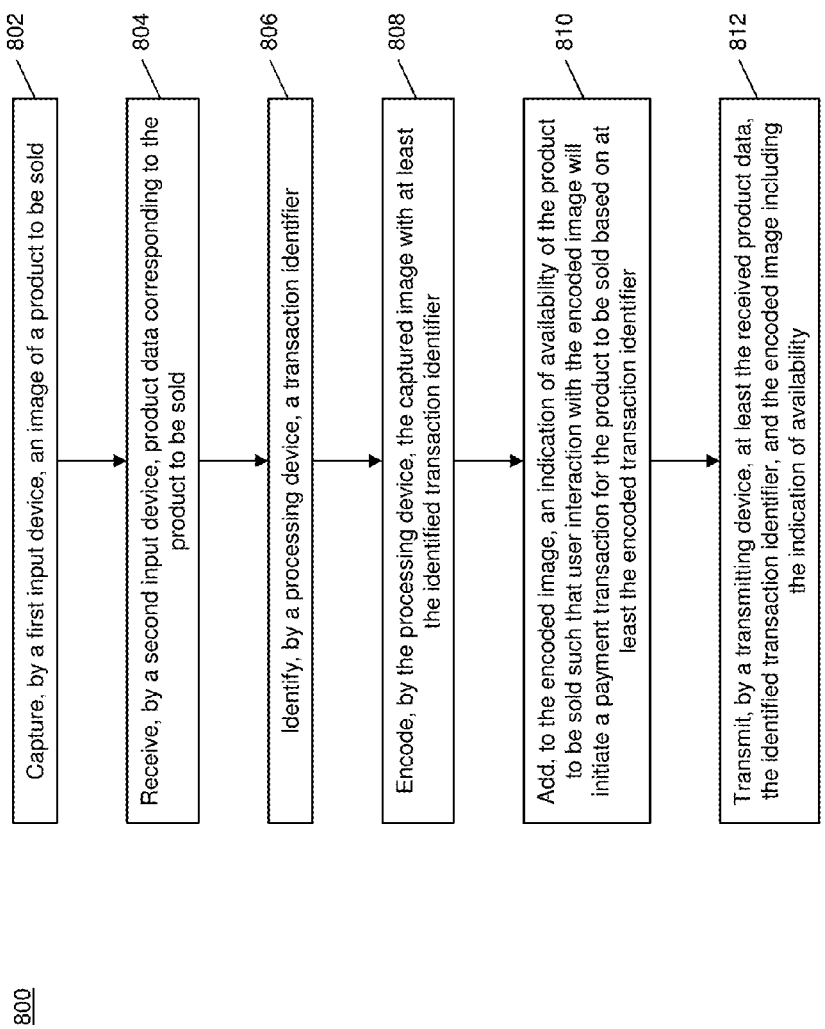

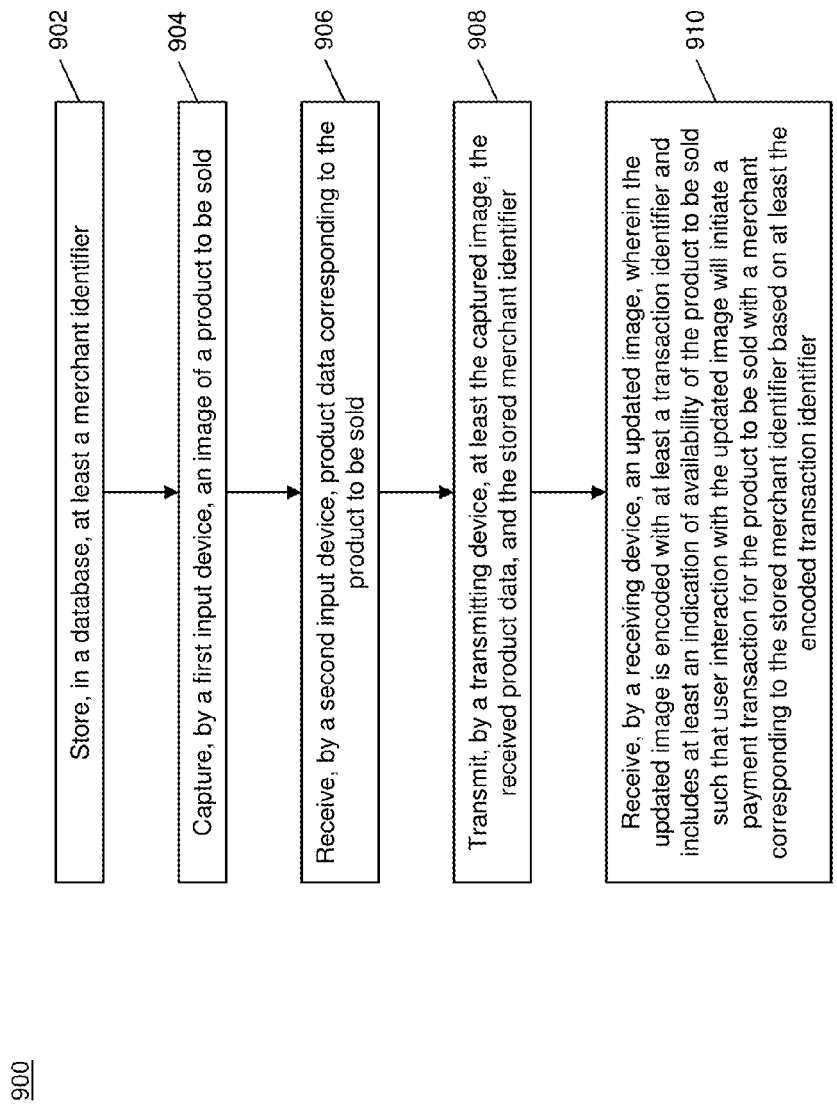

METHOD AND SYSTEM FOR PURCHASING OF GOODS AND SERVICES VIA IMAGE RECOGNITION

FIELD

The present disclosure relates to the facilitating of image-based transactions, specifically the encoding of an image with transaction information for the initiation of a payment transaction for a good or service depicted in the image when interacted with by a consumer.

BACKGROUND

Merchants are motivated to find methods and systems for making transactions easier, faster, and more efficient for consumers, e-commerce transactions conducted via the Internet. A large number of offerings for goods and services on the Internet, combined with impatient consumers, are perceived to result in a loss of potential sales for merchants who do not provide a fast and effective method for facilitating a payment transaction. As a result, many efforts have been made to developed methods for increasing the speed and efficiency of e-commerce transactions.

In one solution, some merchants have streamlined the purchasing process for goods or services. For example, Amazon® offers a one-click solution where a consumer may locate a good or service for purchase, and then purchase the item with a single click, without the need to navigate through shopping cart, billing information, shipping information, and confirmation pages. However, systems such as these still often require the consumer to first arrive at a webpage for the good or service before enabling the consumer to conduct the transaction. Thus, a potential consumer may browse a website and see a product that he or she has a desire to buy, but then must first identify a merchant offering the product, navigate to the merchant website, locate the product, and then initiate the transaction. Such an in-depth and time-intensive process may result in lost sales to consumers that are impatient, easily distracted, or less committed to the purchase.

Thus, there is a need for a technical solution to provide a more efficient way to facilitate payment transactions in e-commerce.

SUMMARY

The present disclosure provides a description of systems and methods for facilitating image-based transactions, wherein nearly any image of a product or service can be embedded with information sufficient to initiate a purchase transaction.

A method for facilitating an image-based transaction includes: capturing, by a first input device, an image of a product to be sold; receiving, by a second input device, product data corresponding to the product to be sold; identifying, by a processing device, a transaction identifier; encoding, by the processing device, the captured image with at least the identified transaction identifier; adding, to the encoded image, an indication of availability of the product to be sold such that user interaction with the encoded image will initiate a payment transaction for the product to be sold based on at least the encoded transaction identifier; and transmitting, by a transmitting device, at least the received product data, the identified transaction identifier, and the encoded image including the indication of availability.

Another method for facilitating an image-based transaction includes: storing, in a database, at least a merchant identifier; capturing, by a first input device, an image of a product to be sold; receiving, by a second input device, product data corresponding to the product to be sold; transmitting, by a transmitting device, at least the captured image, the received product data, and the stored merchant identifier; and receiving, by a receiving device, an updated image, wherein the updated image is encoded with at least a transaction identifier and includes at least an indication of availability of the product to be sold such that user interaction with the updated image will initiate a payment transaction for the product to be sold with a merchant corresponding to the stored merchant identifier based on at least the encoded transaction identifier.

A system for facilitating an image-based transaction includes a first input device, a second input device, a processing device, and a transmitting device. The first input device is configured to capture an image of a product to be sold. The second input device is configured to receive product data corresponding to the product to be sold. The processing device is configured to: identify a transaction identifier; encoded the captured image with at least the identified transaction identifier; and add, to the encoded image, an indication of availability of the product to be sold such that user interaction with the encoded image will initiate a payment transaction for the product to be sold based on at least the encoded transaction identifier. The transmitting device is configured to transmit at least the received product data, the identified transaction identifier, and the encoded image including the indication of availability.

Another system for facilitating an image-based transaction includes a database, a first input device, a second input device, a transmitting device, and a receiving device. The database is configured to store at least a merchant identifier. The first input device is configured to capture an image of a product to be sold. The second input device is configured to receive product data corresponding to the product to be sold. The transmitting device is configured to transmit at least the captured image, the received product data, and the stored merchant identifier. The receiving device is configured to receive an updated image, wherein the updated image is encoded with at least a transaction identifier and includes at least an indication of availability of the product to be sold such that user interaction with the updated image will initiate a payment transaction for the product to be sold with a merchant corresponding to the stored merchant identifier based on at least the encoded transaction identifier.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIGS. 6A-6C are diagrams illustrating a graphical user interface for the capturing and encoding of an image for use in facilitating a payment transaction in accordance with exemplary embodiments.

FIGS. 8 and 9 are flow charts illustrating exemplary methods for facilitating image-based transactions in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Definition of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, etc.

System for Facilitating Image-Based Transactions

Figure 1:
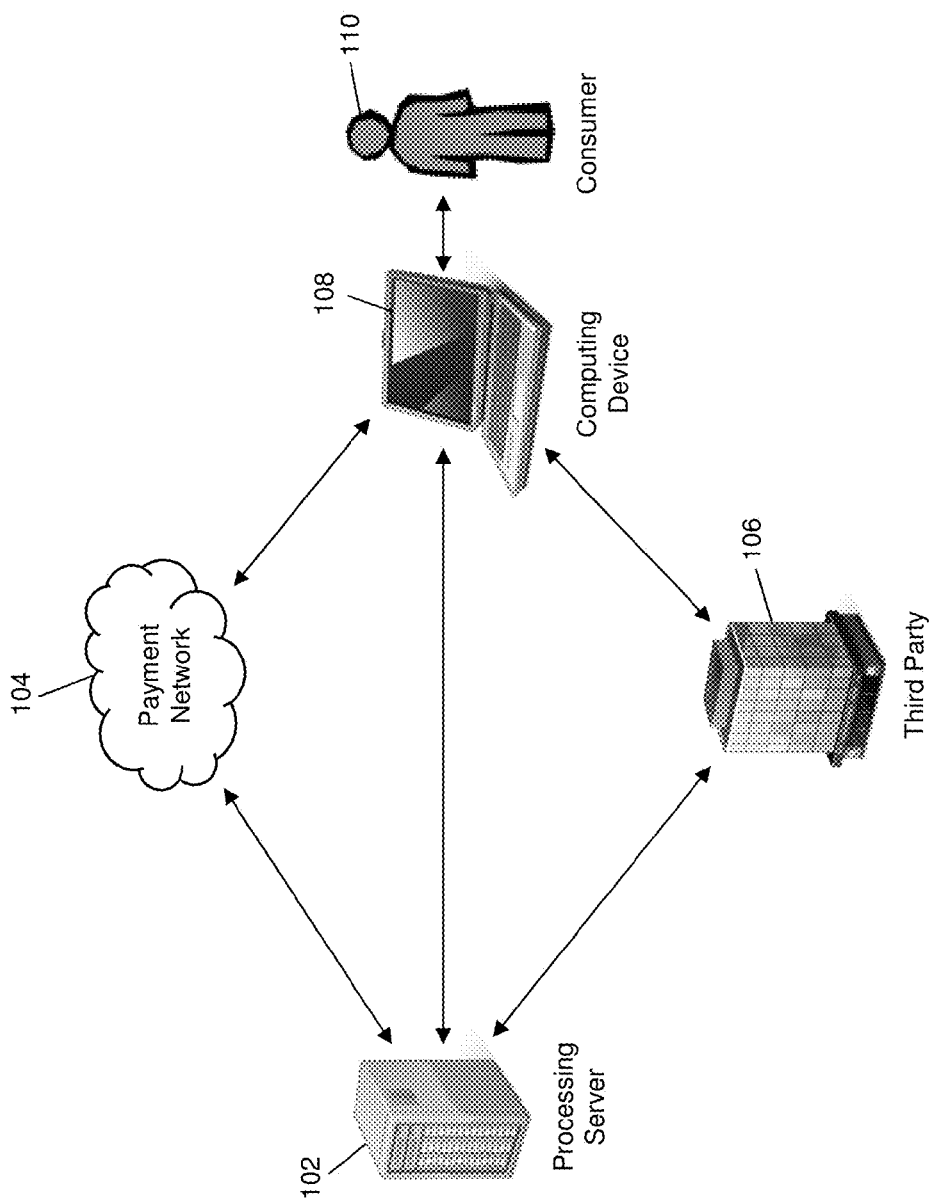
FIG. 1 is a high level architecture illustrating a system for facilitating image-based transactions in accordance with exemplary embodiments.

FIG. 1 illustrates a system 100 for facilitating image-based transactions.

The system 100 may include a processing server 102. The processing server 102 may be a server accessible over a network, such as the Internet, but may be personal computer, laptop, tablet computer, or even a smartphone with sufficient computing power and programming to carry out the functions of the processing server 102. The processing server 102, as discussed in more detail below, may be configured to capture or receive captured images corresponding to products (e.g., goods or services) that may be available for purchase. In an exemplary embodiment, the processing server 102 may be associated with a merchant, such as a merchant offering the products for purchase, a product offering aggregator, a search engine or other third party provider, or any suitable entity that is motivated to provide product images with embedded information for initiating a transaction relevant to the images product. The merchant offering the product and/or the processing server 102 may be associated with a merchant identifier. The merchant identifier may be a unique value associated with the merchant and/or processing server 102, such as a merchant identification number (MID).

In some embodiments, the merchant identifier may be assigned to the processing server 102 by a payment network 104. The payment network 104 may be configured to process payment transactions between two parties, such as the processing server 102 and/or the merchant associated with the processing server 102 and a consumer. In an exemplary embodiment, the payment network 104 may register the merchant identifier as being associated with the processing server 102 and/or the associated merchant.

As discussed in more detail below, the processing server 102 may receive product data from a user knowledgeable about the product (e.g., merchant, manufacturer, or service provider) that corresponds to the captured image. The product data may include data necessary for the conducting of a payment transaction for the corresponding product, such as a product identifier and purchase amount. The processing server 102 may then generate, associate, or identify a transaction identifier, which may be transmitted to the payment network 104 along with the product data. In another embodiment, the processing server 102 may transmit the product data to the payment network 104 and receive the transaction identifier as a response from the payment network 104.

The processing server 102 may then encode the captured image with the transaction identifier and optionally add an indication of availability of the product for express sale to the captured image, to indicate that the image may be used in an image-based transactions for the corresponding product. As discussed in more-detail below, the indication of availability may be an image, such as an icon or a logo, applied to the static image or when a cursor scrolls over the image. In some instances, the indication of availability may be located in a standardized location in the captured image (e.g., a specific corner, such as logo 620 shown in FIG. 6C).

The processing server 102 may then provide the encoded image to a third party 106, such as a retailer, advertiser, web hosting provider, etc. The third party 106 may include the encoded image in a webpage. The webpage including the encoded image may be access by a computing device 108 operated by a consumer 110. The computing device 108 may be any type of computing device suitable for performing the functions as disclosed herein, such as a computer, cellular phone, smart phone, etc. The consumer 110 may then interact with the encoded image displayed on the website via the computing device 108 using methods for interacting with images that will be apparent to persons having skill in the relevant art.

Interacting with the image may cause the computing device 108 and/or the third party 106 (e.g., hosting the web page and receiving the interaction) to transmit the encoded transaction identifier to the payment network 104. The payment network 104 may then identify the product data and merchant identifier corresponding to the transaction identifier and initiate a payment transaction between the consumer 110 and the merchant for the purchase of the product corresponding to the image. The webpage (e.g., and/or the encoded image) may display relevant product data to the consumer 110, and the consumer 110 may confirm the payment transaction (e.g., such as confirming shipping information, quantity, product subcategories, such as size, color, etc., billing information, etc.).

Once the consumer 110 has confirmed, the payment network 104 may process the payment transaction using systems and methods that will be apparent to persons having skill in the relevant art. Such a method may enable the consumer 110 to more quickly and efficiently conduct a payment transaction when viewing an image for a product without needing to navigate to a separate webpage and locate the product for purchase. In addition, it may provide merchants and manufacturers with additional opportunities to reach consumers and achieve sales. This may be particularly beneficial for small businesses that might be unable to develop websites with secure purchasing functionality. These businesses may be able to use the methods and systems disclosed herein and create a webpage that features encoded images of their products, which may enable consumers to purchase the products, without the need to add purchase functionality to their website. This may be or particular advantage as the images can be copied into search results, news reports, or other media outlets not commonly associated with direct product sales.

Processing Server

Figure 2:
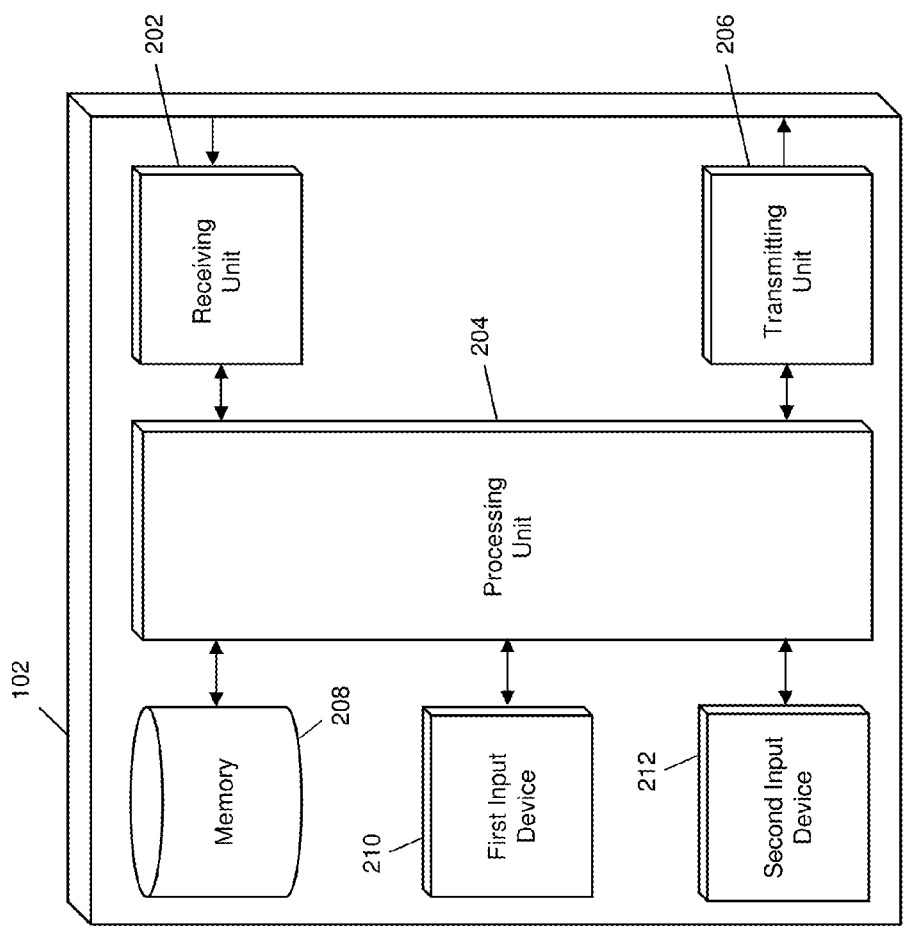
FIG. 2 is a block diagram illustrating the processing server of FIG. 1 for facilitating of image-based transactions in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 1000 illustrated in FIG. 10 and discussed in more detail below may be a suitable configuration of the processing server 102.

The processing server 102 may include a first input device 210. The first input device 210 may be configured to capture an image of a product to be sold. The first input device 210 may be any type of device suitable for performing the functions as disclosed herein, such as a camera. The processing server 102 may also include a second input device 212. The second input device 212 may be configured to receive product data corresponding to the product to be sold as input by a user. The second input device 212 may be any device suitable for performing the functions disclosed herein, such as a keyboard, mouse, click wheel, touch screen, microphone, camera, etc. In some embodiments, the first input device 210 and the second input device 212 may be a single device.

The processing server 102 may also include a processing unit 204. In one embodiment, the processing unit 204 may be configured to identify a transaction identifier to be used to associate with the product to be sold to facilitate payment transactions. In another embodiment, a transmitting unit 206 may transmit a merchant identifier and the received product data to the payment network 104. A receiving unit 202 may receive the transaction identifier from the payment network 104. The transmitting unit 206 and receiving unit 202 may be configured to transmit or receive, respectively, data communicated over one or more networks via one or more network protocols. In some instances, the transmitting unit 206 and the receiving unit 202 may be a single unit.

The processing unit 204 may then encode the captured image with the transaction identifier. In some embodiments, the transmitting unit 206 may also transmit the captured image to the payment network 104, and the receiving unit 202 may receive the encoded image. The processing unit 204 and/or the payment network 104 may also add an indication of availability to the encoded image. Once the processing server 102 is in possession of the image encoded with the transaction identifier, the transmitting unit 206 may transmit the image to the third party 106 for inclusion on a webpage.

The processing server 102 may also include a memory 208. The memory 208 may be used to store any necessary data, such as a merchant identifier, the received product data, captured images, transaction identifiers, etc. The memory 208 may also store program code for one or more application programs configured to perform the functions as disclosed herein, such as an image capture application program configured to operate the first input device 210 and process captured images. Data that may be stored in the memory 208 will be apparent to persons having skill in the relevant art.

Methods for Facilitating Image-Based Payment Transactions

Figure 3:
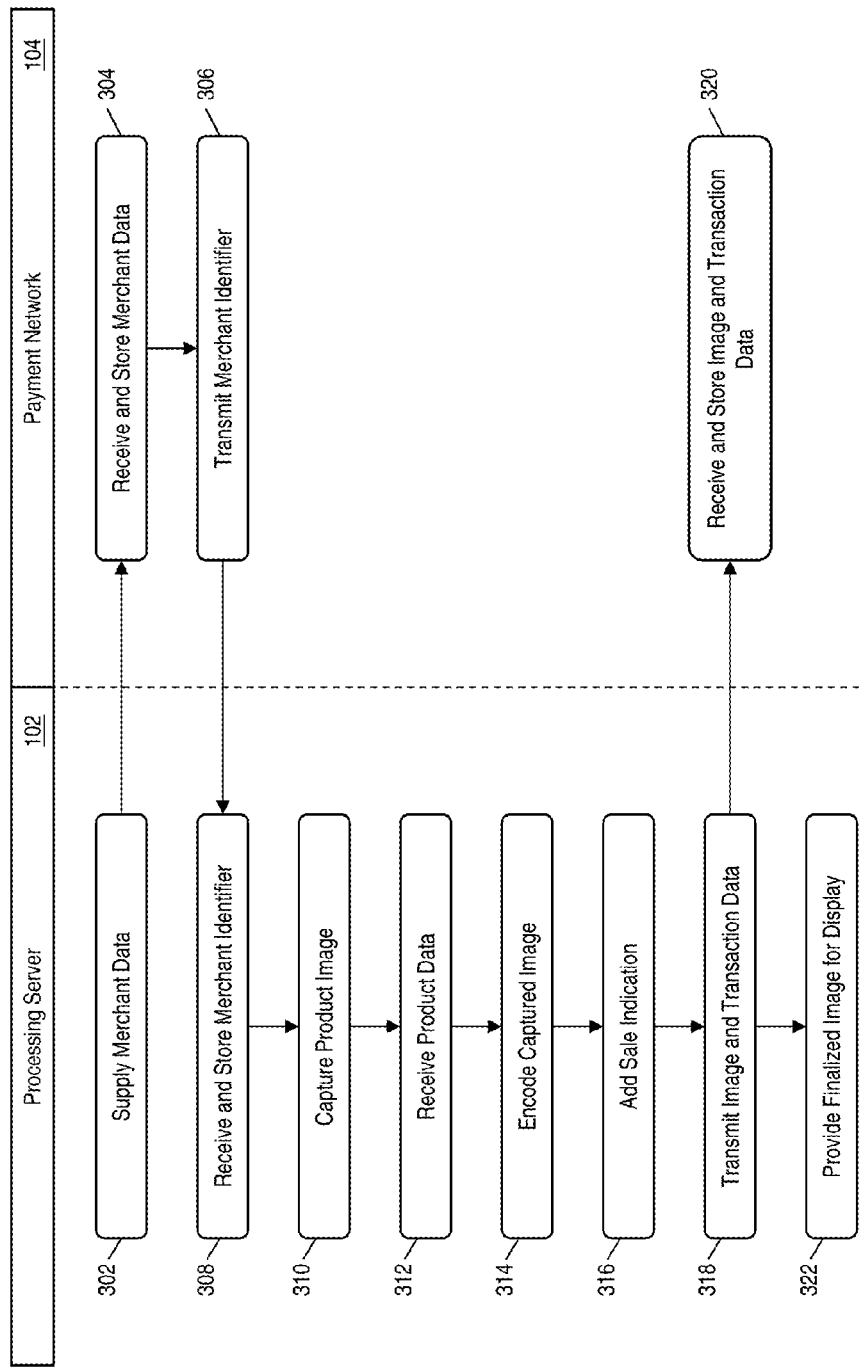
FIGS. 3 and 4 are flow diagrams illustrating processes for facilitating image-based transactions using the system of FIG. 1 in accordance with exemplary embodiments.

FIG. 3 illustrates a method for facilitating image-based transactions using the system 100 of FIG. 1.

In step 302, the processing server 102 may supply data associated with a merchant offering one or more products for purchase to the payment network 104. The payment network 104 may receive the data, in step 304, and store the merchant data. The merchant data may include a merchant name, payment account information, and/or any other suitable information that will be apparent to persons having skill in the relevant art. In step 306, the payment network 104 may identify a merchant identifier to be associated with the merchant and may transmit the identified merchant identifier to the processing server 102.

In step 308, the processing server 102 may receive and store the merchant identifier (e.g., in the memory 208). In step 310, the processing server 102 may capture an image of a product to be sold. In step 312, the processing server 102 may receive product data corresponding to the product to be sold via an input device from a user. In some instances, the product data may be received from another entity, such as a manufacturer of the product to be sold. In step 314, the processing server 102 may identify a transaction identifier to correspond to a payment transaction for the product to be sold and may encode the captured image with the transaction identifier.

In step 316, the processing server 102 may add an indication of availability of the product for sale to the encoded image. In some embodiments, the processing server 102 may add the indication to a predetermined location in the image, such as a specific corner (e.g., the bottom right corner of the image). In step 318, the processing server 102 may transmit the transaction data (e.g., the product data, the transaction identifier, etc.) to the payment network 104 for use when processing payment transactions for the product. In some embodiments, the processing server 102 may also transmit the encoded image to the payment network 104.

In step 320, the payment network 104 may receive the transaction data and may store the transaction data, which may be recalled and used when a transaction for the product to be sold is initiated by the consumer 110. In step 322, the processing server 102 may provide the finalized image (e.g., encoded and with the indication of availability added) to the third party 106 for display.

Figure 4:
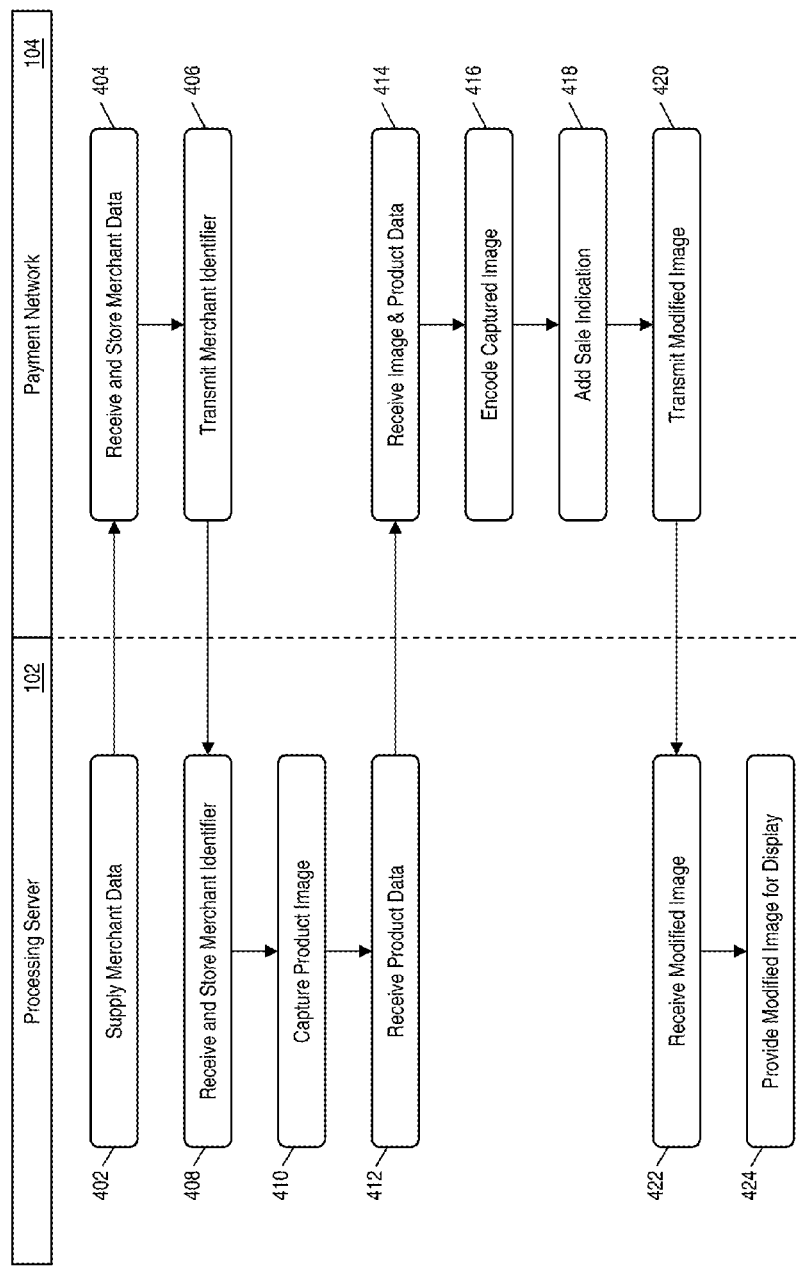

FIG. 4 illustrates an alternative method for facilitating an image-based payment transaction using the system 100 of FIG. 1.

In step 402, the processing server 102 may supply the merchant data to the payment network 104, such as a payment account to be used when processing payment transactions for products offered for sale by the merchant. In step 404, the payment network 104 may receive and store the merchant data. In step 406, the payment network 104 may identify a merchant identifier for use to identify the merchant and may transmit the merchant identifier to the processing server 102.

In step 408, the processing server 102 may receive and store the merchant identifier. In step 410, the processing server 102 may capture an image of the product to be sold using methods that will be apparent to persons having skill in the relevant art. In step 412, the processing server 102 may receive input of product data corresponding to the product to be sold, including at least a purchase amount, and may transmit the product data and image to the payment network 104.

In step 414, the payment network 104 may receive the captured image and the product data from the processing server 102. In step 416, the payment network 104 may identify a transaction identifier to associate with the product to be sold to identify a transaction for the purchase of the product, and may encode the captured image with the transaction identifier. In step 418, the payment network 104 may add an indication of availability to the image to indicate to a consumer that the product captured in the image may be purchased. In some embodiments, the indication of availability may be added to a predetermined, standardized location of the image. In one embodiment, the indication of availability may be associated with the payment network 104.

In step 420, the payment network 104 may transmit the modified image that is encoded with the transaction identifier and including the indication of availability to the processing server 102. The processing server 102 may receive the modified image in step 422, and may, in step 424, provide the modified image (e.g., to the third party 106) for display. In some embodiments, the processing server 102 may host the image and/or a webpage including the image for display to the consumer 110 via the computing device 108.

Method for Processing a Payment Transaction Initiated via an Image

Figure 5A:
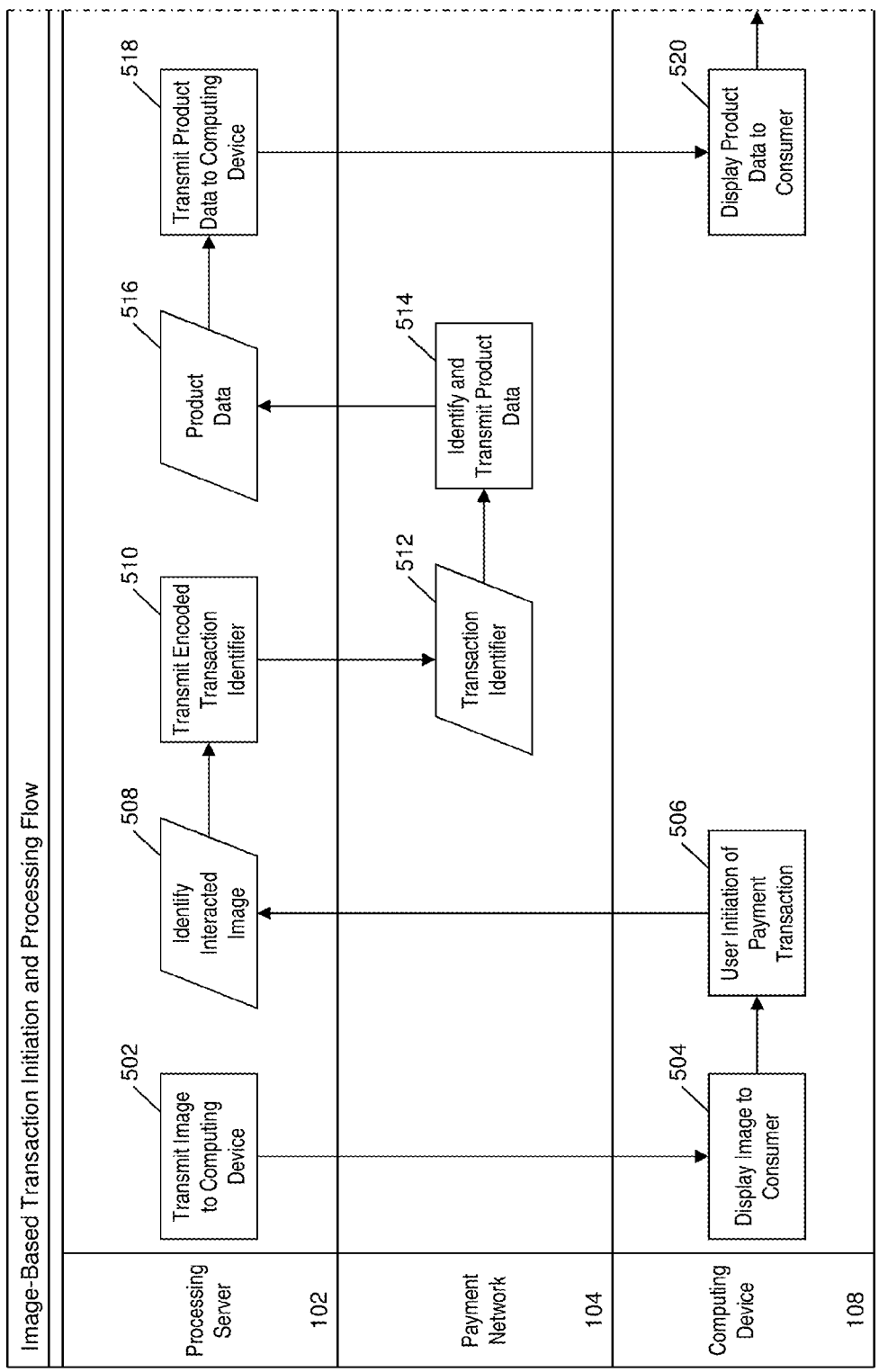
FIGS. 5A and 5B are a flow diagram illustrating a process for capturing and encoding an image and subsequent use of the image to initiate a payment transaction in accordance with exemplary embodiments.
Figure 5B:
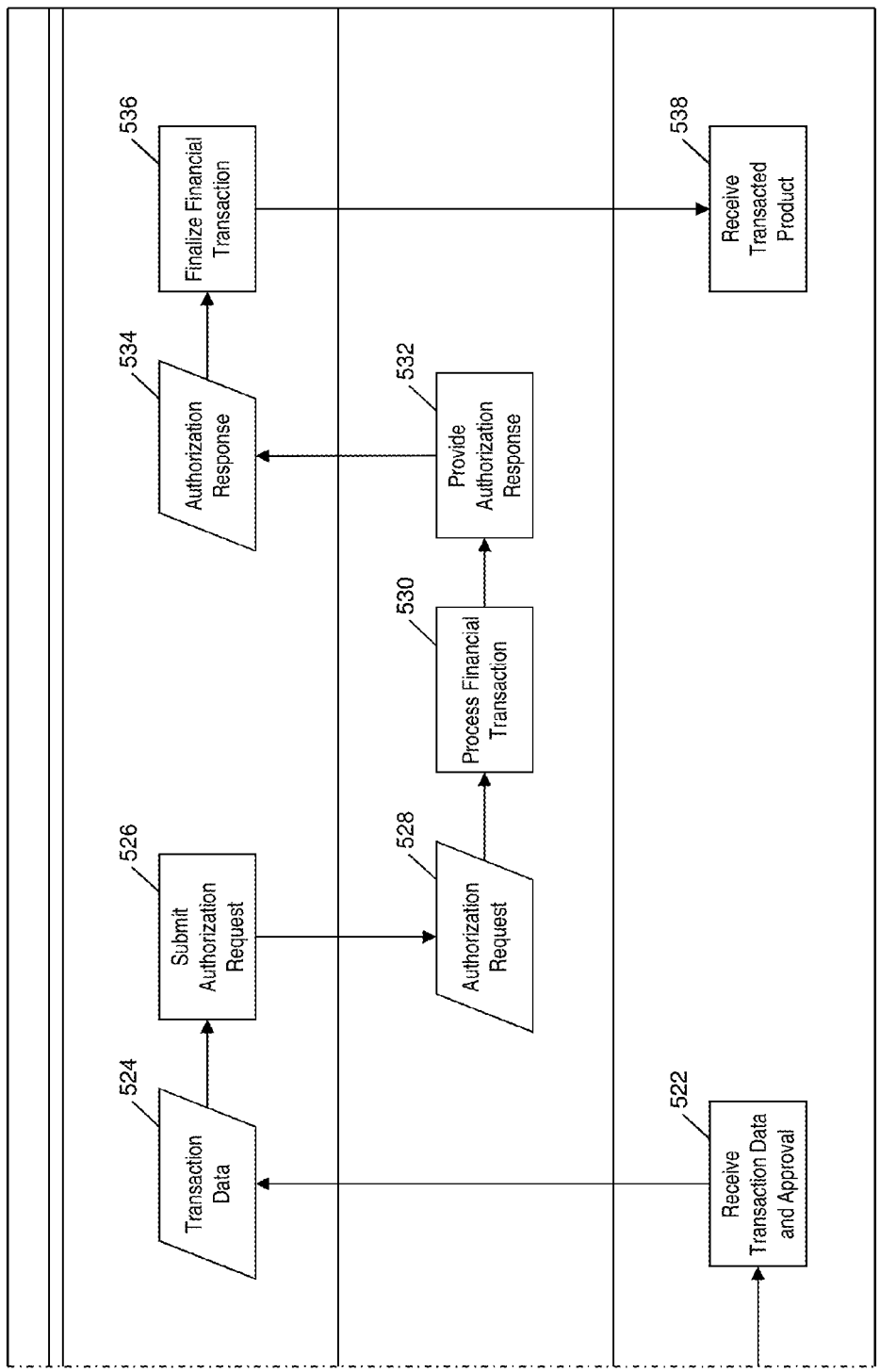

FIGS. 5A and 5B illustrate a method for processing a payment transaction initiated via an image as part of the system 100 of FIG. 1.

In step 502, the processing server 102 may transmit an image to the computing device 108, either directly or through intermediaries such as search engines or product aggregators. The image may be a finalized image created using the method illustrated in FIG. 3 or 4 including at least an encoded transaction identifier and an indication of availability of a corresponding product for sale. In step 504, the computing device 108 may display the image to the consumer 110. It will be apparent to persons having skill in the relevant art that the processing server 102 may act as a web host and may host a webpage including the image for access by the computing device 108, and that the image may be transmitted to the computing device 108 as part of the accessing of the corresponding webpage. It will be further apparent to persons having skill in the relevant art that some and/or all of the actions performed by the processing server 102 as illustrated in FIGS. 5A and 5B may be performed by the third party 106 or other suitable entity.

In step 506, the computing device 108 may receive a user action interacting with the image to initiate a payment transaction for the product corresponding to the image. In step 508, the user interaction may be transmitted to the processing server 102 in the form of an indication of the image that was interacted with by the user. Methods and systems for identifying a user interaction with an image hosted on a webpage and the transmitting of data corresponding to the interaction to a server hosting the webpage will be apparent to persons having skill in the relevant art. The processing server 102 may thereby identify the transaction identifier encoded in the image and may, in step 510, transmit the transaction identifier to the payment network 104.

In step 512, the payment network 104 may receive the transaction identifier and may then, in step 514, identify product data corresponding to the transaction identifier (e.g., and previously supplied by the processing server 102). The payment network 104 may transmit the identified product data corresponding to the product to be sold to the processing server 102, which may receive the data in step 516. In step 518, the processing server 102 may transmit the product data to the computing device 108 (e.g., via the webpage).

In step 520, the computing device 108 may receive the product data and may display the product data to the consumer 110. In step 522, the computing device 108 may receive an indication from the consumer 110 approving the transaction and any additional transaction data that may be necessary, such as information regarding payment, shipping, quantity, color, size, etc. The computing device 108 may transmit the approval and transaction data to the processing server 102, which may receive the information in step 524.

In step 526, the processing server 102 may generate and submit an authorization request for a payment transaction for the purchase of the product to the payment network 104, which may receive the request in step 528. The authorization request may include at least the merchant identifier, a transaction amount, and consumer payment information. In step 530, the payment network 104 may process the payment transaction using methods and systems that will be apparent to persons having skill in the relevant art. In step 532, the payment network 104 may provide an authorization response generated and/or received as a result of the transaction processing to the processing server 102 indicating approval of the payment transaction.

In step 534, the processing server 102 may receive the authorization response. In step 536, the processing server 102 may finalize the payment transaction. Finalization of the payment transaction may include generation and distribution of a receipt, transmitting of transacted data, shipping of transacted goods and/or services, etc. In step 538, the computing device 108 and/or the consumer 110 may receive the transacted-for product following the successful purchase.

Graphical User Interface

FIGS. 6A-6C illustrate a graphical user interface for the capturing, encoding, and finalization of an image used to facilitate an image-based transaction as discussed herein.

FIG. 6A illustrates a computing device 602, which may be the processing server 102 and/or a computing device used to communicate with and/or operate the processing server 102. As illustrated in FIG. 6A, the computing device 602 may include a display 604. The display 604 may be any type of display suitable for performing the functions as disclosed herein, including, but not limited to, a touch screen display. The computing device 602 may be used to capture the image of a product 606 to be sold. To assist with the capturing of the image, the display 604 may display a reticule 608 to assist the user as well as a current view of the product 606.

The display 604 may also include a capture button 610. The capture button 610 may be configured such that, when interacted with by the user, the image as indicated by the reticule 608 may be captured by the computing device 602. The computing device 602 may capture the image and may then display a new screen as illustrated in FIG. 6B. The new screen displayed by the display 604 may include a merchant name 612. The merchant name 612 may be used to indicate to the user the merchant that is to be associated with the product to be sold (e.g., which will be involved in payment transactions initiated by the image). The merchant name 612 may be the merchant identifier or associated with the merchant identifier. In some embodiments, the merchant name 612 may be a field for input of the merchant name or identifier by the user. For example, an artist can take an image of his or her art, and the artist's merchant identifier can be associated with it, such that when displayed on an artist site (e.g., "Etsy" or "eBay") or other aggregator, the image with the transaction information facilitates an easy purchase option.

The display 604 may also include a purchase amount field 614. The purchase amount field 614 may be a field that is editable by the user that may be used to provide the amount that a consumer will be charged for each unit of the product. It will be apparent to persons having skill in the relevant art that the purchase amount field 614 may be an editable field, a drop-down menu, a selection list, or any other suitable method of input. The display 604 may also include a complete button 616. The user may interact with the complete button 616 once satisfied with the displayed product data.

Once the user interacts with the complete button 616, the processing server 102 may transmit the product data to the payment network 104, may encode the captured image with a transaction identifier, and may add an indication of availability 620 to the captured image. As illustrated in FIG. 6C, the user may be presented with the finalized image 618 via the display 604 following the interaction with the complete button 616. The finalized image 618 may include the indication of availability 620. The indication of availability 620 may be placed in a standardized location of the image, such as the bottom right corner as illustrated in FIG. 6C. The display 604 may also display product data 622 as confirmation of the previously supplied product data.

The indication of availability 620 may be an icon, logo, image, graphic, outline, or any other suitable indication. In some embodiments, the icon, logo, image, or graphic may be associated with the merchant offering the product 606 for purchase. In other embodiments, the processing unit 204 may detect the product 606 in the captured image using methods and systems for image detection that will be apparent to persons having skill in the relevant art. In a further embodiment, the indication of availability 620 may be an outline of the detected product 606.

Figures 7A, 7B:
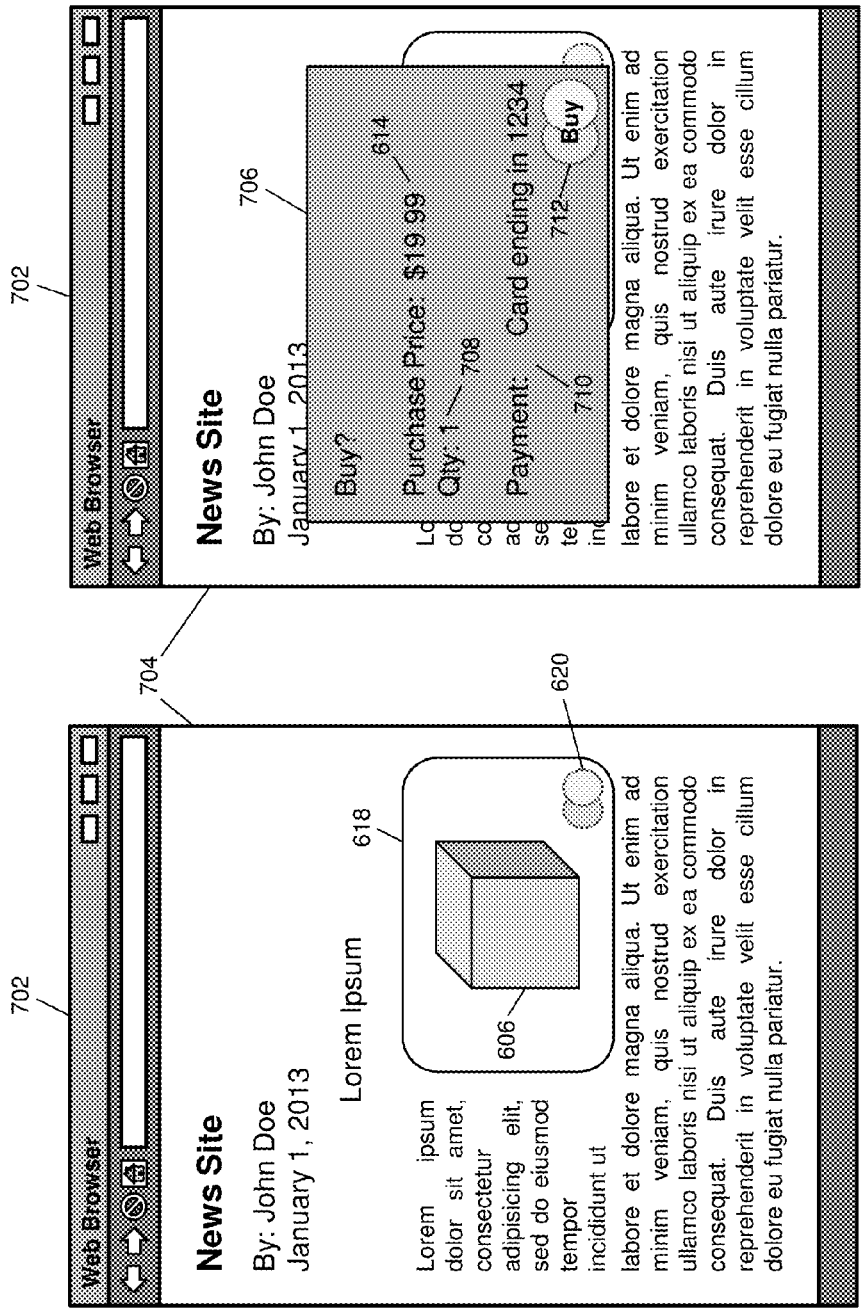
FIGS. 7A and 7B are diagrams illustrating a graphical user interface for the facilitating of an image-based payment transaction in accordance with exemplary embodiments.

FIGS. 7A and 7B illustrate a graphical user interface of the computing device 108 for use in conducting a payment transaction for the product via the finalized image 618.

As illustrated in FIG. 7A, the computing device 108 may execute a web browsing application program 702. The browser application 702 may display a web page 704, which may be hosted by the processing server 102, the third party 106, or other entity as will be apparent to persons having skill in the relevant art. As illustrated in FIG. 7A, the web page 704 may be a news article on a news site, which may be about the product 606 and may include the finalized image 618 of the product 606. The finalized image 618 may include the indication of availability 620. It will be apparent to persons having skill in the relevant art that the finalized image 618 may be displayed on any suitable web page 704, such as a social network website, a website for a non-profit or charity organization (e.g., where the consumer 110 may make a donation via the finalized image 618), etc.

The consumer 110 may interact with the indication of availability 620, the finalized image 618, and/or the product 606 to initiate a payment transaction for the product 606. Once the payment transaction is initiated, the consumer 110 may be presented with a purchase window 706 as illustrated in FIG. 7B. The purchase window 706 may be a pop-up window, an overlay window, a separate webpage, or any other window and/or display suitable for performing the functions as disclosed herein.

The product window 706 may include the purchase amount 614 of the product 606. The product window 706 may also include a quantity 708. In some embodiments, the quantity 708 may be editable by the user, such as via an editable field, drop-down menu, selection list, radio button, etc. In a further embodiment, the purchase amount 614 displayed may be updated based on the quantity 708. In another embodiment, the product window 706 may also include a total amount based on the purchase amount 614 and the quantity 708. Of course, other information relevant to that particular product (size, color, and other characteristics) can be displayed for information and/or selection.

The product window 706 may also include a payment method 710. As illustrated in FIG. 7B, the payment method 710 may be previously provided by the consumer 110, such as for faster conducting of the payment transaction. In some embodiments, the product window 706 may feature a selection (e.g., radio button, drop-down menu, etc.) of a payment method 710. In other embodiments, the product window 706 may include fields for the providing of payment details by the consumer 110. Methods and systems for obtaining consumer payment information will be apparent to persons having skill in the relevant art.

The product window 706 may also include a purchase button 712. When the consumer 110 interacts with the purchase button 712, the payment network 104 may process the payment transaction based on the product data and consumer-supplied data using methods and systems that will be apparent to persons having skill in the relevant art. Such an interface as illustrated in FIGS. 7A and 7B, in conjunction with the systems and methods disclosed herein, may enable the consumer 110 to quickly and easy conduct a payment transaction for the product 606 via the finalized image 618, without requiring the consumer 110 to leave the web page 704 or to locate a page suitable for purchasing of the product 606. The result may be a faster, more efficient system that may be beneficial for consumers and merchants alike.

First Exemplary Method for Facilitating an Image-Based Transaction

FIG. 8 illustrates a method 800 for facilitating an image-based transaction.

In step 802, an image of a product to be sold may be captured by a first input device (e.g., the first input device 210). In one embodiment, capturing the image may further include detecting, by a processing device, the product to be sold in the captured image using image detection. In step 804, product data corresponding to the product to be sold may be received by a second input device (e.g., the second input device 212). In some embodiments, the product data may include at least one of: purchase amount, product name, product description, shipping information, merchant name, merchant location, merchant address, payment account number, and sale information. In one embodiment, the first input device 210 and the second input device 212 may be a single input device.

In step 806, a processing device (e.g., the processing unit 204) may identify a transaction identifier. In step 808, the processing device 204 may encode the captured image with at least the identified transaction identifier. In step 810, an indication of availability (e.g., the indication of availability 620) may be added to the encoded image such that user interaction with the encoded image will initiate a payment transaction for the product to be sold based on at least the encoded transaction identifier. In one embodiment, the indication of availability 620 may be at least one of: an icon, an image, and an outline. In a further embodiment, the outline may be of the product to be sold. In some embodiments, the user interaction may include a selection of the indication of availability 620 with an input device.

In step 812, a transmitting device (e.g., the transmitting unit 206) may transmit at least the received product data, the identified transaction identifier, and the encoded image including the indication of availability 620. In one embodiment, the method 800 may further include transmitting, by the transmitting device 206, a merchant identifier corresponding to a merchant offering the product to be sold. In a further embodiment, the indication of availability 620 may be an icon, logo, or image associated with the merchant offering the product to be sold.

Second Exemplary Method for Facilitating an Image-Based Transaction

FIG. 9 illustrates a method 900 for facilitating an image-based transaction.

In step 902, at least a merchant identifier may be stored in a database (e.g., the memory 208). In step 904, an image of a product to be sold may be captured by a first input device (e.g., the first input device 210). In one embodiment, capturing the image of the product may further include detecting, by a processing device, the product to be sold in the captured image using image detection.

In step 906, product data corresponding to the product to be sold may be received by a second input device (e.g., the second input device 212). In some embodiments, the product data may include at least one of: purchase amount, product name, product description, shipping information, merchant name, merchant location, merchant address, payment account number, and sale information. In one embodiment, the first input device 210 and the second input device 212 may be a single input device. In step 908, a transmitting device (e.g., the transmitting unit 206) may transmit at least the captured image, the received product data, and the stored merchant identifier.

In step 910, a receiving device (e.g., the receiving unit 202) may receive an updated image, wherein the updated image is encoded with at least a transaction identifier and includes at least an indication of availability (e.g., the indication of availability 620) of the product to be sold such that user interaction with the updated image will initiate a payment transaction for the product to be sold with a merchant corresponding to the stored merchant identifier based on at least the encoded transaction identifier. In one embodiment, the indication of availability 620 may be at least one of: indicia, an icon, an image, and an outline. In some embodiments, the user interaction may include selection of the indication of availability 620 with an input device.

Computer System Architecture

Figure 10:
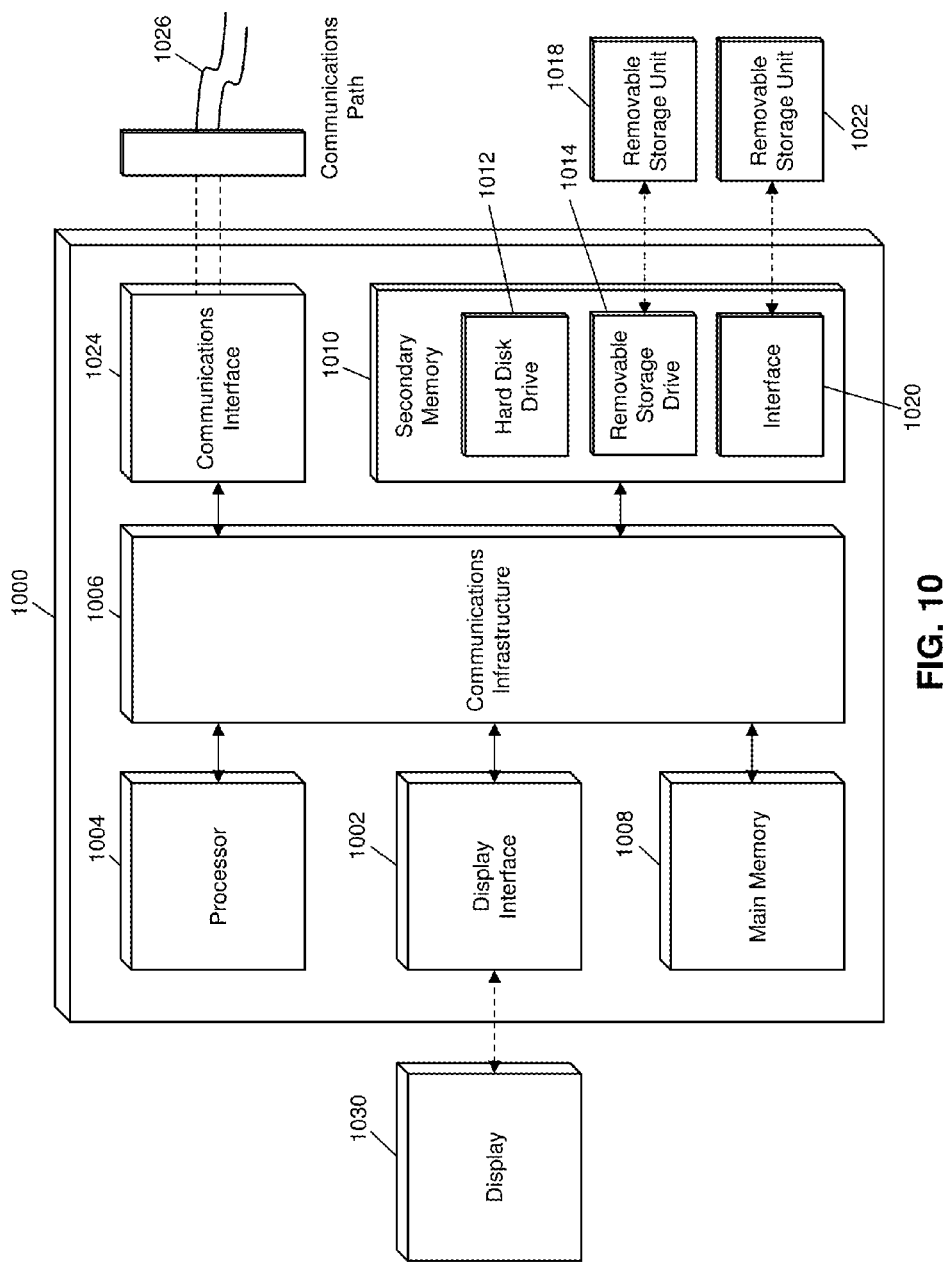
FIG. 10 is a block diagram illustrating exemplary computer system architecture in accordance with exemplary embodiments.

FIG. 10 illustrates a computer system 1000 in which embodiments of the present disclosure, or portions thereof, may be implemented as computer-readable code. For example, the processing server 102 of FIG. 1 may be implemented in the computer system 1000 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3, 4, 5A, 5B, 8, and 9.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor device or unit as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1018, a removable storage unit 1022, and a hard disk installed in hard disk drive 1012.

Various embodiments of the present disclosure are described in terms of this example computer system 1000. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1004 may be a special purpose or a general purpose processor device. The processor device 1004 may be connected to a communication infrastructure 1006, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 1000 may also include a main memory 1008 (e.g., random access memory, read-only memory, etc.), and may also include a secondary memory 1010. The secondary memory 1010 may include the hard disk drive 1012 and a removable storage drive 1014, such as a floppy disk drive, a magnetic tape drive, an optical disk drive, a flash memory, etc.

The removable storage drive 1014 may read from and/or write to the removable storage unit 1018 in a well-known manner. The removable storage unit 1018 may include a removable storage media that may be read by and written to by the removable storage drive 1014. For example, if the removable storage drive 1014 is a floppy disk drive, the removable storage unit 1018 may be a floppy disk. In one embodiment, the removable storage unit 1018 may be non-transitory computer readable recording media.

In some embodiments, the secondary memory 1010 may include alternative means for allowing computer programs or other instructions to be loaded into the computer system 1000, for example, the removable storage unit 1022 and an interface 1020. Examples of such means may include a program cartridge and cartridge interface (e.g., as found in video game systems), a removable memory chip (e.g., EEPROM, PROM, etc.) and associated socket, and other removable storage units 1022 and interfaces 1020 as will be apparent to persons having skill in the relevant art.

Data stored in the computer system 1000 (e.g., in the main memory 1008 and/or the secondary memory 1010) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1000 may also include a communications interface 1024. The communications interface 1024 may be configured to allow software and data to be transferred between the computer system 1000 and external devices. Exemplary communications interfaces 1024 may include a modem, a network interface (e.g., an Ethernet card), a communications port, a PCMCIA slot and card, etc. Software and data transferred via the communications interface 1024 may be in the form of signals, which may be electronic, electromagnetic, optical, or other signals as will be apparent to persons having skill in the relevant art. The signals may travel via a communications path 1026, which may be configured to carry the signals and may be implemented using wire, cable, fiber optics, a phone line, a cellular phone link, a radio frequency link, etc.

Computer program medium and computer usable medium may refer to memories, such as the main memory 1008 and secondary memory 1010, which may be memory semiconductors (e.g., DRAMs, etc.). These computer program products may be means for providing software to the computer system 1000. Computer programs (e.g., computer control logic) may be stored in the main memory 1008 and/or the secondary memory 1010. Computer programs may also be received via the communications interface 1024. Such computer programs, when executed, may enable computer system 1000 to implement the present methods as discussed herein. In particular, the computer programs, when executed, may enable processor device 1004 to implement the methods illustrated by FIGS. 3, 4, 5A, 5B, 8, and 9, as discussed herein. Accordingly, such computer programs may represent controllers of the computer system 1000. Where the present disclosure is implemented using software, the software may be stored in a computer program product and loaded into the computer system 1000 using the removable storage drive 1014, interface 1020, and hard disk drive 1012, or communications interface 1024.

Techniques consistent with the present disclosure provide, among other features, systems and methods for assigning a spend profile to a mobile device based on location and transaction data. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A computer-implemented method for facilitating an image-based transaction, comprising:
   storing, in a database device of a processing server, at least a plurality of transaction identifiers;
   capturing, by a first input device of the processing server, a picture of a product to be sold, said processing server being configured to communicate over a communication network with at least a financial payment network that is configured to process payment transactions between computing devices of consumers and merchants;
   electronically receiving, by a second input device of the processing server, product data corresponding to the product to be sold as input by a user of the processing server;
   identifying, from said database device, by a processing device of the processing server, a transaction identifier, for the captured picture of the product to be sold;
   before attempted transactions associated with the captured picture occur, electronically transmitting, by a transmitting device of the processing server, over the communication network, to the financial payment network, the identified transaction identifier and the product data;
   subsequent to transmitting the identified transaction identifier and the product data to the financial payment network, electronically encoding, by the processing device of the processing server, the captured picture of the product to be sold with at least the identified transaction identifier;
   adding, by the processing device of the processing server, to the encoded captured picture of the product to be sold, an indication of availability of the product to be sold; and
   electronically transmitting, by the transmitting device of the processing server, to a third party, at least (a) the received product data and (b) the captured picture (i) encoded with the identified transaction identifier and (ii) including the indication of availability,
      wherein said third party includes said captured picture (i) encoded with the identified transaction identifier and (ii) including the indication of availability on a web page enabling a user to interact with the encoded captured picture of the product to be sold, and
      wherein upon user interaction of the encoded captured picture of the product to be sold, said third party transmits said transaction identifier of said encoded captured picture to the payment network to initiate said electronic payment transaction without requiring user-navigation to a separate merchant webpage to locate said product to be sold on said separate merchant website.

2. The method of claim 1, wherein the indication of availability includes an icon, an image, or an outline or any combination thereof.

3. The method of claim 1, wherein the user interaction includes selection of the indication of availability with the computing device.

4. The method of claim 1, wherein the product data includes a purchase amount, product name, product description, shipping information, merchant name, merchant location, merchant address, payment account number, or sale information or any combination thereof.

5. The method of claim 1, further comprising:
   electronically transmitting, by the transmitting device of the processing server, a merchant identifier corresponding to a merchant offering the product to be sold.

6. The method of claim 5, wherein the indication of availability is an icon, logo, or image associated with the merchant offering the product to be sold.

7. The method of claim 1, wherein capturing the picture of the product to be sold further includes detecting, by the processing device, the product to be sold in the captured picture using image detection.

8. The method of claim 1, wherein the first input device and the second input device are a single input device.

9. A computer-implemented method for facilitating an image-based transaction, comprising:
storing, in a database device of a processing server, at least a merchant identifier, said processing server being configured to communicate over a communication network with at least a financial payment network that is configured to process payment transactions between computing devices of consumers and merchants;
capturing, by a first input device of the processing server, a picture of a product to be sold;
electronically receiving, by a second input device of the processing server, product data corresponding to the product to be sold as input by a user of the processing server;
before attempted transactions associated with the captured picture occur, electronically transmitting, by a transmitting device of the processing server, at least the captured picture of the product to be sold, the received product data, and the stored merchant identifier to the financial payment network, wherein said financial payment network encodes the captured picture with at least a transaction identifier and includes, with the encoded picture of the product to be sold, at least an indication of availability of the product to be sold;
subsequent to transmitting the captured picture, the received product data and the stored merchant identifier to the financial payment network, receiving, by a receiving device of the processing server, an updated encoded picture of the product to be sold, from the financial payment network, wherein the updated encoded picture is the picture of the product to be sold (i) as encoded by the financial payment network with at least the transaction identifier and (ii) including at least the indication of availability of the product to be sold; and
electronically transmitting, by the transmitting device of the processing server, to a third party, at least (a) the received product data and (b) the updated encoded picture of the product to be sold (i) encoded with at least the transaction identifier and (ii) including the indication of availability,
wherein said third party includes at least said updated encoded picture of the product to be sold and indication of availability on a web page enabling a user to interact with said updated encoded picture of the product to be sold, and
wherein upon user interaction of the updated encoded picture of the product to be sold, said third party transmits said transaction identifier of said updated encoded picture to the payment network to initiate said electronic payment transaction without requiring user-navigation to a separate merchant webpage to locate said product to be sold on said separate merchant website.

10. The method of claim 9, wherein the indication of availability includes an icon, an image, or an outline or any combination thereof.

11. The method of claim 9, wherein the user interaction includes selection of the indication of availability with the computing device.

12. The method of claim 9, wherein the product data includes a purchase amount, product name, product description, shipping information, merchant name, merchant location, merchant address, payment account number, or sale information or any combination thereof.

13. The method of claim 9, wherein capturing the picture of the product to be sold further includes detecting, by a processing device, the product to be sold in the captured picture using image detection.

14. The method of claim 9, wherein the first input device and the second input device are a single input device.

15. An electronic system for facilitating an image-based transaction, comprising:
a database device, of a processing server, configured to store at least a plurality of transaction identifiers;
a first input device, of the processing server, configured to capture a picture of a product to be sold, said processing server being configured to communicate over a communication network with at least a financial payment network, wherein said financial payment network is configured to process payment transactions between computing devices of consumers and merchants;
a second input device, of the processing server, configured to electronically receive product data corresponding to the product to be sold as input by a user of the processing server;
a processing device, of the processing server, configured to:
identify, from the database device, a transaction identifier for the captured picture of the product to be sold;
encode the captured picture of the product to be sold with at least the identified transaction identifier; and
add, to the encoded capture picture of the product to be sold, an indication of availability of the product to be sold; and
a transmitting device, of the processing server, configured to
electronically transmit over the communication network, to the financial payment network, the identified transaction identifier and the product data (i) before attempted transactions associated with the encoded captured picture are initiated and (ii) before the encoding of the captured picture, and
electronically transmit, to a third party, at least (a) the received product data and (b) the captured picture of the product to be sold (i) encoded with the identified transaction identifier and (ii) including the indication of availability,
wherein said third party includes said encoded picture of the product to be sold (i) encoded with the identified transaction identifier and (i) including the indication of availability on a web page, enabling the user to interact with the encoded picture of the product to be sold, and
wherein upon user interaction of the encoded capture picture of the product to be sold on said web page, said third party transmits said transaction identifier of said encoded captured picture to the payment network to initiate said electronic payment transaction without requiring user-navigation to a separate merchant webpage to locate said product to be sold on said separate merchant website.

16. The system of claim 15, wherein the indication of availability includes an icon, an image, or an outline or any combination thereof.

17. The system of claim 15, wherein the user interaction includes selection of the indication of availability with the computing device.

18. The system of claim 15, wherein the product data includes a purchase amount, product name, product description, shipping information, merchant name, merchant location, merchant address, payment account number, or sale information or any combination thereof.

19. The system of claim 15, wherein the transmitting device is further configured to electronically transmit a merchant identifier corresponding to a merchant offering the product to be sold.

20. The system of claim 19, wherein the indication of availability is an icon, logo, or image associated with the merchant offering the product to be sold.

21. The system of claim 15, wherein the processing device is further configured to detect the product to be sold in the captured picture using image detection.

22. The system of claim 15, wherein the first input device and the second input device are a single input device.

23. An electronic system for facilitating an image-based transaction, comprising:
- a database device, of a processing server, configured to store at least a merchant identifier, said processing server being configured to communicate over a communication network with at least a financial payment network that is configured to process payment transactions between computing devices of consumers and merchants;
- a first input device, of the processing server, configured to capture a picture of a product to be sold;
- a second input device, of the processing server, configured to electronically receive product data corresponding to the product to be sold as input by a user of the processing server;
- a transmitting device, of the processing server, configured to electronically transmit at least the captured picture of the product to be sold, the received product data, and the stored merchant identifier to the financial payment network before attempted transactions associated with the captured picture occur, wherein said financial payment network encodes the captured picture of the product to be sold with at least a transaction identifier and includes, with the encoded captured picture, at least an indication of availability of the product to be sold; and
- a receiving device, of the processing server, configured to electronically receive an updated encoded picture of the product to be sold, from the financial payment network, subsequent to transmitting the captured picture, the received product data and the stored merchant identifier to the financial payment network, wherein the updated encoded picture is the picture (i) as encoded by the financial payment network with at least the transaction identifier and (ii) including at least the indication of availability of the product to be sold, wherein
    the transmitting device is further configured to electronically transmit, to a third party, at least (a) the received product data and (b) the updated encoded picture (i) encoded with at least the transaction identifier, (2) indication of availability, and (3) received product data,
        wherein said third party includes at least said updated encoded picture and indication of availability on a web page, enabling the user to interact with the updated encoded picture of said product to be sold on said web page, and
        wherein upon said user interaction of the updated encoded picture of the product to be sold, said third party transmits said transaction identifier of said updated encoded picture to the payment network to initiate said electronic payment transaction without requiring user-navigation to a separate merchant webpage to locate said product to be sold on said separate merchant website.

24. The system of claim 23, wherein the indication of availability includes an icon, an image, or an outline or any combination thereof.

25. The system of claim 23, wherein the user interaction includes selection of the indication of availability with the computing device.

26. The system of claim 23, wherein the product data includes a purchase amount, product name, product description, shipping information, merchant name, merchant location, merchant address, payment account number, or sale information or any combination thereof.

27. The system of claim 23, wherein the processing device is further configured to detect the product to be sold in the captured picture using image detection.

28. The system of claim 23, wherein the first input device and the second input device are a single input device.

* * * * *